G. H. RABENALT.
BATTERY PLATE.
APPLICATION FILED FEB. 14, 1912.
1,184,993.
Patented May 30, 1916.
2 SHEETS—SHEET 2.
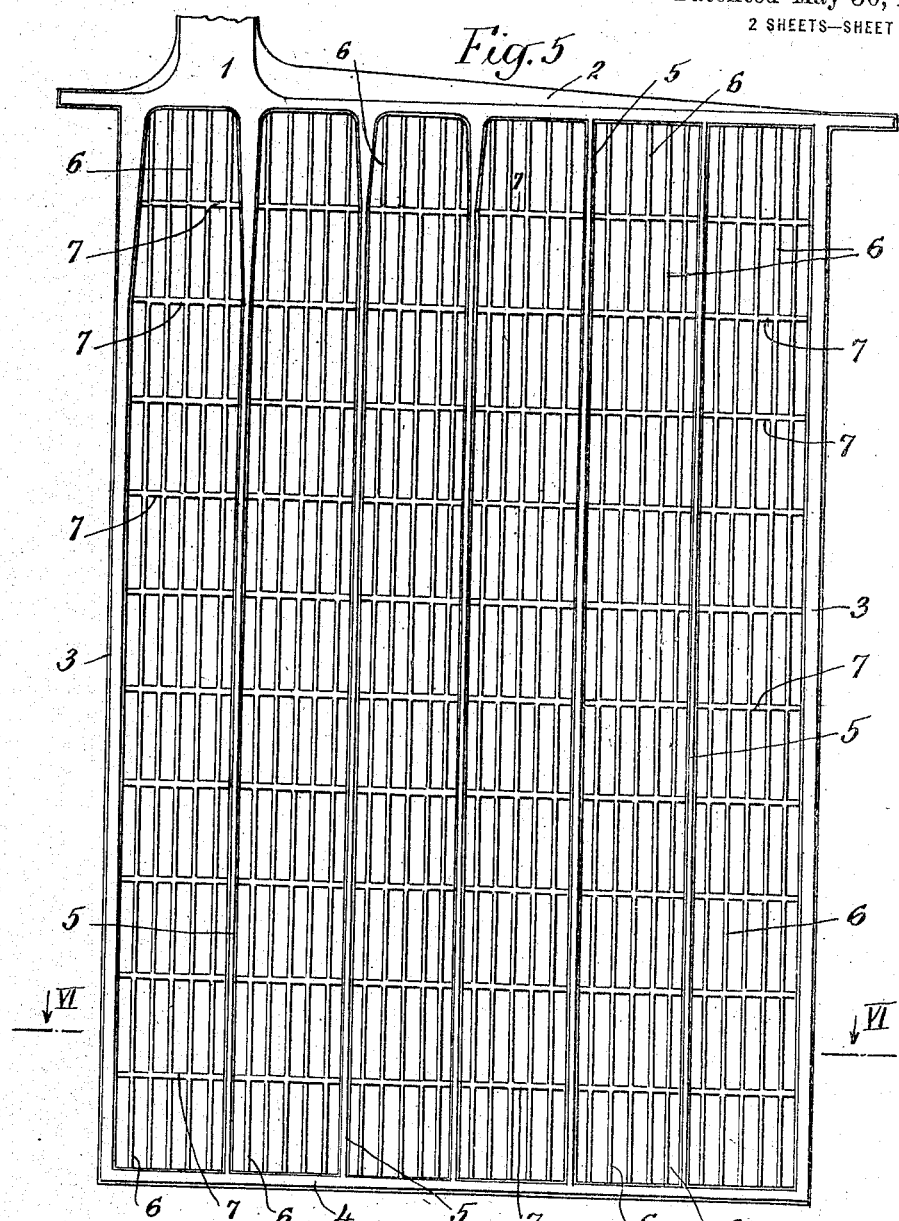

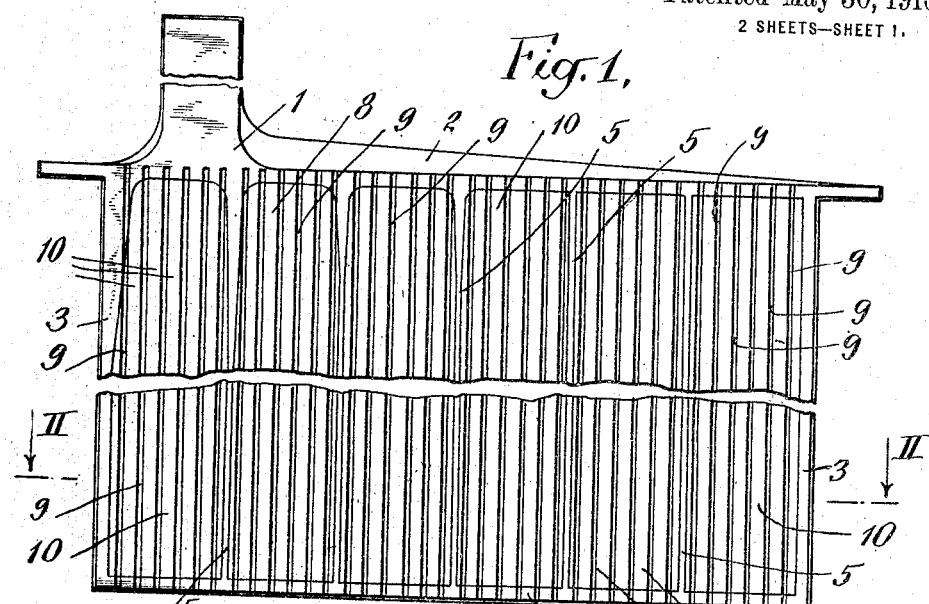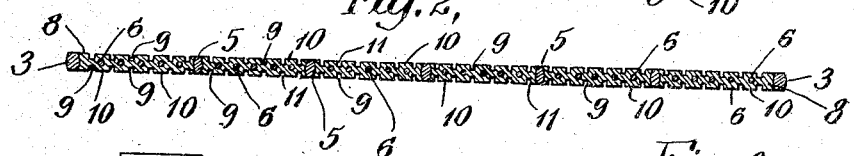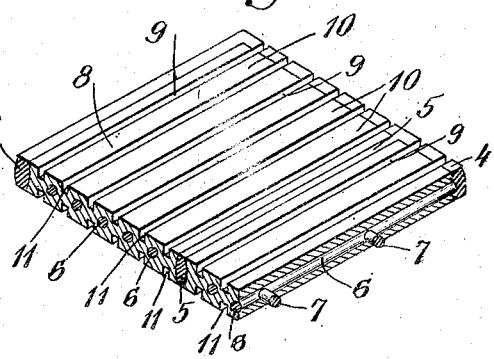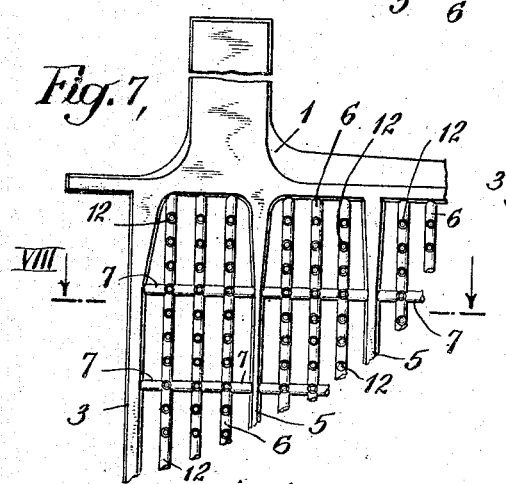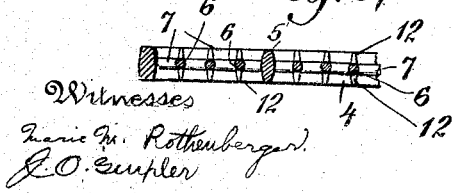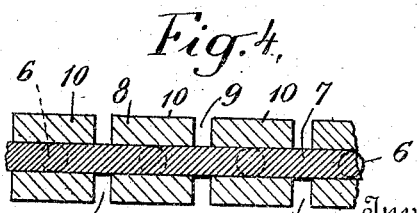

UNITED STATES PATENT OFFICE.

GUSTAV H. RABENALT, OF BUFFALO, NEW YORK, ASSIGNOR TO GOULD STORAGE BATTERY COMPANY, A CORPORATION OF NEW YORK.

BATTERY-PLATE.

1,184,993.

Specification of Letters Patent.

Patented May 30, 1916.

Application filed February 14, 1912. Serial No. 677,625.

*To all whom it may concern:*

Be it known that I, GUSTAV H. RABENALT, a citizen of the United States, and a resident of Buffalo, county of Erie, and State of New York, have invented certain new and useful Improvements in Battery-Plates, of which the following is a specification.

My invention relates to improvements in storage battery plates, and a grid for the same, and most particularly to that form of plate known as the pasted type. The plate is adapted for use either as a positive or as a negative plate.

One object of the invention is to provide a grid which may be substantially completely inclosed by the paste or active material so as to practically eliminate polarization, which occurs where there are exposed portions of lead grid.

A further object of the invention is to provide an improved form of grid in which the expansion and contraction of the dense paste does not readily loosen the paste from the supporting grid.

A further object of the invention is to so construct the surface of the active material that ample opportunity is allowed for expansion thereof, and also so that the area of the surface of the active material is largely increased.

Further objects, features and advantages will more clearly appear from the detailed description given below, taken in connection with the accompanying drawings which form a part of this specification.

In the drawings, Figure 1 is a side elevation of an improved plate embodying my invention in one form. Fig. 2 is a section taken on the line II—II of Fig. 1. Fig. 3 is a perspective of a portion of the plate shown in Figs. 1 and 2. Fig. 4 is a transverse section through a portion of the plate shown in Fig. 3, taken through one of the lateral conductors. Fig. 5 is a side elevation of the grid of the plate shown in Fig. 1, before active material has been applied thereto. Fig. 6 is a transverse section taken on the line VI—VI of Fig. 5. Fig. 7 is a side elevation of a portion of a modified form of grid. Fig. 8 is a transverse section taken on the line VIII—VIII of Fig. 7.

Referring to Figs. 1 to 6, the grid 1 comprises a surrounding frame having a lateral supporting member 2, side members 3—3, a bottom member 4, and a plurality of vertical strengthening ribs 5. In between the ribs 5 and the members 2, 3 and 4, I provide lattice work comprising a series of vertical conductors 6 extending from the top member 2 to the bottom member 4 of the grid, and also a series of horizontal conductors 7 extending between the respective strengthening ribs 5. As shown in Figs. 2, 3 and 4, the lattice work comprising the vertical conductors 6 and horizontal conductors 7, is one-third as thick as the strengthening ribs 5 and frame 2, 3, 4. All of the parts so far described are cast integral out of lead, whereby a strong lead grid is formed having a lattice work and an ample number of supporting conductors whereby the active material may be properly held and electrically connected. The vertical strengthening ribs 5 are of the same thickness as the surrounding frame members 2, 3 and 4. To this grid I apply as active material a dense paste 8 which is relatively hard. The paste is applied until the thickness of the paste is substantially equal to that of the surrounding frame members and the vertical strengthening ribs 5. The plate is then dried, and then milled by any suitable milling machine, so as to form a series of grooves 9 in the active material, as clearly shown in Figs. 3 and 4. These grooves may be made in other ways, for instance, they may be made by passing properly shaped knives over the paste when still in a soft and plastic condition, and subsequently setting the paste or cementing the same, in order to prevent the paste from closing the grooves. These grooves 9 are formed on both sides of the plate and are staggered with relation to the vertical supporting conductors 6, as clearly shown in Figs. 2, 3 and 4, and extend into the plate substantially one-third its thickness. It will therefore be seen that the plate finally formed consists of a series of columns 10 of active material through the center of which pass vertically the reinforcing conductors 6, and that these columns are connected by relatively thin webs of active material 11.

The modification shown in Figs. 7 and 8 is substantially the same as that shown in Figs. 1 and 2, with the exception that the vertical strengthening conductors 6 are provided with a series of projections 12 thereupon, which aid in holding the active material in place. These projections are preferably tapered as shown in Fig. 8, so that very little if any of their surface is exposed after the active material is applied. The active material is applied to this form of grid, and milled, in the same manner as described in connection with Figs. 1 to 4.

The grooves 9 should preferably be in a vertical direction, that is, they should be vertical when the plate is suspended and in use. Although I have only shown the grooves running in one direction, that is vertically, it may be found desirable in some instances to provide grooves in other directions.

As a practical matter, the conductors preferably should not be less than $\frac{3}{64}$ of an inch, and preferably not substantially more than $\frac{1}{8}$ of an inch, or not more than $\frac{1}{3}$ the thickness of the grid. With this form of grid after the paste has been applied, the lattice work of lead conductors constituting by far the greater part of the conducting portions of the plate, are completely inclosed by the paste or active material, thus practically eliminating the polarization, which occurs where there are exposed portions of the lead grid, which polarization would much decrease the effectiveness of the paste. In positive plates the active material tends to expand in use, and in the negative to contract. But with such expansion or contraction, in my improved form of plate, the dense paste does not readily loosen from the supporting grid. The series of continuous parallel grooves 9 extending vertically of the plate allow ample opportunity for expansion of the active material in the positive plate, and being continuous and formed on both sides of the plate opposite one another, and symmetrical, such expansion will not distort the plate or affect its uniform character. Furthermore, the grooves increase the acid area of the plate, and since the capacity is substantially a function of the acid area, that is, the exposed active material, the capacity of the plate is proportionately increased. As seen from the drawings, there may be several of these grooves between each pair of the thick strengthening ribs 5, and I preferably provide one groove 9 between each pair of thin longitudinal conductors 6. The grooves are made continuous from end to end without cutting out any part of the lattice work, and are milled to such a depth that the bottoms of the grooves are substantially in the same plane as the upper face of the lattice work. These grooves also increase very largely the area of the surface of active material, which is desirable.

By constructing the plate in the manner thus described it will be seen that the inclosed conductors 6 of the lattice work are the centers of columns of active material, which are substantially square in cross section, the grooves separating these columns from one another except where they are connected by the relatively thin center webs 11, of active material. This form and construction gives a most effective anchoring to the active material by the embedded conductors, and enables polarization to be reduced to a minimum causing practically all parts of the surface of the active material to be acted upon uniformly, and at the same time providing a sufficient amount of inactive lead conducting material distributed throughout the plate, as desired, for mechanical purposes.

Although I have described my improvements in great detail and with respect to particular embodiments thereof, nevertheless I do not desire to be limited to such details except as clearly specified in the appended claims, since many changes and modifications may well be made without departing from the spirit and scope of my invention in its broadest aspect.

Having fully and clearly described my improvements, what I claim as new and desire to secure by Letters Patent, is:

1. A battery plate having a supporting lead grid and active material carried thereby, said grid comprising a surrounding frame, a plurality of substantially vertical and parallel strengthening ribs of substantially the same thickness as the frame, and a lattice work of vertical and horizontal conductors between said ribs, said lattice work being materially thinner than the ribs and adapted to be covered by the active material.

2. A battery plate having a grid, comprising a surrounding frame, a plurality of parallel strengthening ribs of substantially the thickness of the frame, extending vertically of the grid, and a lattice work of relatively small conductors parallel with the sides of the frame and connecting the frame with the strengthening ribs, said latticework being completely inclosed by a paste of active material and said active material having vertical grooves therein crossing the lattice-work conductors.

3. A battery plate having a supporting lead grid and active material carried thereby, said grid comprising a surrounding frame, a plurality of upright strengthening ribs of substantially the same thickness as the frame, and a lattice work of relatively small conductors between the ribs, some of the conductors of the lattice work being substantially vertical, and said lattice work being materially thinner than the frame and ribs, whereby it is adapted to be covered by the active material.

4. A battery plate having a supporting lead grid and active material carried thereby, said grid comprising a surrounding frame, a plurality of vertical strengthening ribs, and a lattice work of conductors between the ribs, said lattice work having vertical conductors extending substantially from top to bottom of the grid, and horizontal conductors extending between the respective ribs, said lattice work being substantially one third as thick as the strengthening ribs, whereby the lattice work may be covered with the active material.

5. A battery plate having a supporting lead grid and active material carried thereby, said grid comprising a surrounding frame, a plurality of vertical strengthening ribs, and a lattice work of conductors between the ribs, said lattice work having vertical conductors extending substantially from top to bottom of the grid, and horizontal conductors extending between the respective ribs, said lattice work being substantially one third as thick as the strengthening ribs, whereby the lattice work may be covered with the active material, said active material having continuous grooves in its surface on both sides of the plate, which grooves pass the horizontal conductors of the lattice work but do not extend into the same, and which grooves are staggered with respect to the vertical conductors of the lattice work.

6. A battery plate having a supporting lead grid with a lattice work of conductors, those extending in one direction of the plate being thin as compared with the thickness of the plate, and active material carried upon both sides of the lattice work and provided with continuous grooves crossing the said thin conductors but not passing into the same.

7. A battery plate having a lead grid provided with substantially vertical strengthening conductors and smaller horizontal conductors and active material held by said grid, said conductors being substantially embedded by the active materials at all points, said active material being provided with substantially vertical grooves.

8. A battery plate having a supporting lead grid and active material carried thereby, said grid comprising a surrounding frame carrying a lattice-work of conductors thinner than the frame, the active material substantially covering said lattice-work and having a plurality of substantially parallel grooves therein crossing the thin lattice-work but not passing into the same.

9. A battery plate comprising sections of substantially vertical columns of active material connected by relatively thin webs of active material, a reinforcing conductor extending up through each column, strengthening ribs between the sections, and a surrounding frame.

10. A battery plate comprising sections of substantially vertical columns of active material connected by relatively thin webs of active material, a reinforcing conductor extending up through each column, strengthening ribs between the sections, a surrounding frame, and substantially horizontal reinforcing conductors extending through the columns and connecting webs.

11. A battery plate comprising sections of columns of active material connected by relatively thin webs of active material, a reinforcing conductor extending through each column, strengthening ribs between the sections, and a surrounding frame.

12. A battery plate having a plurality of columns of paste as active material with reinforcing conductors extending up through the columns, and a surrounding frame, said columns of paste being connected with one another by active material of less thickness than the columns.

In testimony whereof, I have signed my name to this specification, in the presence of two subscribing witnesses.

GUSTAV H. RABENALT.

Witnesses:
D. M. NOBLE,
P. W. ENGLISH.